United States Patent [19]

Todd, Jr. et al.

[11] Patent Number: 4,669,069
[45] Date of Patent: May 26, 1987

[54] DUAL REFLECTED ENERGY BEAM ALIGNMENT SYSTEM

[75] Inventors: Lee T. Todd, Jr., Lexington, Ky.; Henry E. Kloss, Cambridge, Mass.

[73] Assignee: Cathodochromic Partners, Ltd., Louisville, Ky.

[21] Appl. No.: 788,974

[22] Filed: Oct. 18, 1985

[51] Int. Cl.[4] ............................................. G01S 15/88
[52] U.S. Cl. ........................................ 367/96; 367/111
[58] Field of Search .................... 367/95, 96, 114, 111

[56] References Cited

U.S. PATENT DOCUMENTS

| | | | |
|---|---|---|---|
| 2,629,082 | 2/1953 | Hare | 367/114 |
| 2,743,429 | 4/1956 | Erdman et al. | 367/95 |
| 3,435,232 | 3/1966 | Sorensen | 250/203 |
| 3,635,551 | 1/1972 | Szymber | 250/204 |
| 3,650,615 | 3/1972 | Aoki et al. | 367/96 X |
| 4,085,425 | 4/1978 | Hamill | 358/237 |
| 4,327,427 | 4/1982 | Hotta et al. | 367/96 |
| 4,344,160 | 8/1982 | Gabriel et al. | 367/96 |

Primary Examiner—Richard A. Farley
Attorney, Agent, or Firm—King and Schickli

[57] ABSTRACT

An apparatus for properly aligning a cathode-ray tube projection unit before a viewing screen includes a pair of ultrasonic rangefinders and a cooperating pair of light emitting diode (LED) reader units. One ultrasonic rangefinder and one reader unit are connected to each of two opposite sides of the projection unit. Each rangefinder is directed toward the viewing screen to sense the distance between the viewing screen and the side of the projection unit to which the rangefinder is connected. The cooperating LED reader unit then indicates whether that side is too close to, too far away from or a proper operating distance from the viewing screen. A method for properly positioning the projection unit includes the steps of: (1) sensing the respective distances between opposite sides of the projection unit and the viewing screen; (2) indicating whether the opposite sides are too close to, too far away or a proper operating distance from the viewing screen; and (3) adjusting the positioning of the unit as indicated.

7 Claims, 3 Drawing Figures

DUAL REFLECTED ENERGY BEAM ALIGNMENT SYSTEM

TECHNICAL FIELD

The present invention relates generally to the teleconferencing systems and, more particularly, to an apparatus and method for aligning a cathode ray tube projection unit a proper operating distance from and parallel to a viewing screen as to provide a clear, sharp image.

BACKGROUND OF THE INVENTION

Various means and methods are known for projecting images from phosphor coated cathode ray tubes for standard television. However, it should be appreciated that these standard phosphor CRT displays do not emit sufficient light for high contrast projected images. Further, if the emission intensity of a phosphor CRT display is increased to improve contrast, a loss in resolution results.

Recognizing this shortcoming of phosphor CRT displays, cathodochromic CRT projection displays have been developed, such as disclosed in U.S. Pat. No. 3,959,584 issued to Todd, Jr. Using a cathodochromic CRT (CCRT) with any standard Group III facsimile machine and a speaker phone, individuals have the capability of scanning, transmitting, displaying and annotating virtually any standard size document in a simple-to-use conferencing environment. In contrast to phosphors, cathodochromic materials have the property that they do not emit light but rather change color when excited by an electron beam beyond some threshold. In the case of cathodochromic bromine sodalite, some of the coloration can be bleached by visible light, optical mode coloration, but the remaining coloration, thermal mode coloration, remains indefinitely. The material is heated to approximately 300° C. to cause erasure. Since the induced thermal mode coloration is unaffected by exposure to visible light, the images on the cathodochromic image screen of a cathodochromic CRT can be projected by either reflecting light from the screen's surface or transmitting light through the screen. In the former case, the device operates in a manner similar to an opaque projector. In the latter case, the screen acts as a light valve passing light in the uncolored areas and absorbing it in the colored areas.

Since cathodochromic CRT displays utilize reflected or transmitted rather than emitted light, cathodochromic CRT displays provide higher resolution images since images can be written using very low electron beam current. As a further advantage, image brightness is much greater since it comes from an external projection lamp, thus providing images that may be viewed in high ambient light conditions.

It should be recognized that the improved resolution and higher brightness images available with cathodochromic CRT displays can only be realized and appreciated when the projection unit is properly aligned with the display screen. When the projection unit is positioned too close to or too far away from the viewing screen, the focus is not sharp and resolution suffers. Further, when the projection unit is positioned at an angle rather than parallel to the viewing screen, the resulting image suffers from distortions due to the different projection distances that projected image must travel to reach the screen. Thus, it should be appreciated that proper alignment of the projection unit with the viewing screen is critical.

SUMMARY OF THE INVENTION

Accordingly, it is a primary object of the present invention to provide an improved method and apparatus for properly aligning a CRT projection unit before a viewing screen.

Another object of the invention is to provide an inexpensive apparatus that efficiently and effectively aligns a CRT projection unit parallel to a viewing screen so as to substantially eliminate distortion caused by one side being closer to the viewing screen than the opposite side.

A further object of the present invention is to provide a reliable and accurate apparatus for aligning a CRT projection unit a proper operating distance from a viewing screen so as to produce a sharp focus image of high resolution and contrast.

Still another object of the present invention is to provide a fast and simple method for properly positioning a CRT projection unit before a viewing screen.

Additional objects, advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved apparatus is provided for alignment of a CRT projection unit before a viewing screen so as to produce a high resolution, high contrast image substantially without distortion. The apparatus includes a pair of ultrasonic range finders, one range finder mounted to each of two opposite sides of the projection or console unit. Each of the ultrasonic range finders is directed toward the viewing screen and accurately measures the distance from the respective side of the projection unit to the viewing screen. Since the distance between two opposite sides, such as the left and right sides of the projection unit, to the viewing screen are each being measured, it is clear that the projection unit may be positioned substantially parallel to the viewing screen. A pair of visual reader units responsive to the two range finders indicate when the projection unit is aligned a proper operating distance from and parallel to the viewing screen.

More specifically, each of the ultrasonic range finders includes a transmitter for transmitting an energy beam from the range finder and directing it toward the viewing screen. The energy beam is reflected by the viewing screen back toward the range finder where it is detected by a receiver. The elapsed time between the transmission of the energy beam and the receipt of the reflected beam accurately indicates the distance between the projection unit and the viewing screen.

Preferably, each of the visual reader units includes three light emitting diodes. Illumination of the first of the three diodes indicates that that side of the projection unit to which the particular reader unit is attached is too close to the viewing screen. Actuation of a second of the three diodes indicates that the corresponding side of the projection unit is the proper operating distance from the viewing screen. Similarly, actuation or illumination of the third of the three diodes indicates that the corresponding side of the projection unit is too far away from the viewing screen. An adjusting means may be provided to fine tune the desired distance to be determined by each reader unit.

In a further aspect of the invention, in accordance with its objects and purposes, a method for properly aligning a CRT projection unit before a viewing screen is also provided. The initial step of the method involves sensing the distances between opposite sides of the projection unit and the viewing screen, such as by use of ultrasonic range finders. The next step involves indicating whether each of the opposite sides of the projection unit is too close to the viewing screen, too far away from the viewing screen or a proper operating distance from the viewing screen. The last step involves the adjusting of the positioning of the projection unit relative to the viewing screen until the opposite sides of the projection unit are concurrently indicated as being the proper operating distance from the screen. Adjusting the positioning of the projection unit in this manner assures that the projection unit is also parallel to the viewing screen so as to eliminate distortions.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modification in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of this specification, illustrates several aspects of the present invention, and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
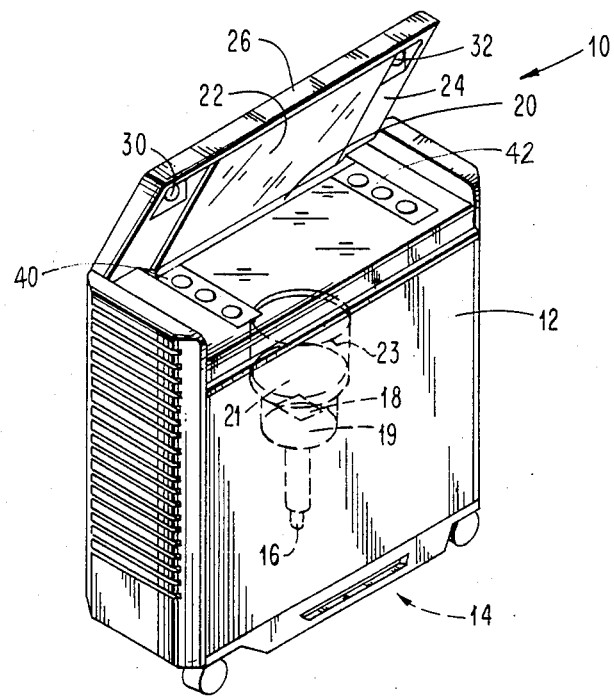
FIG. 1 is a perspective view of a cathode ray tube projection unit including the aligning apparatus of the present invention.

Reference is now made to FIG. 1 showing a cathodochromic cathode ray tube projection unit 10 equipped with an alignment apparatus constructed in accordance with the teachings of the present invention. The projection unit 10 includes a cabinet or console 12 mounted on wheels. A CCRT projection system, schematically shown at 14, is similar to the one disclosed in the previously discussed U.S. Pat. No. 3,959,584 to Todd, Jr.. The projection system 14 includes a cathode or electron gun 16 for generating an electron beam that impinges on a cathodochromic image target panel 18. Light is reflected from the panel 18 and into a Schmidt mirror 19; the image is then projected through the face 21 of the tube and through a lens 23. The projected image is reflected by means of a mirror 22 mounted to the inner surface 24 of the pivotal cabinet lid 26.

Figure 2:
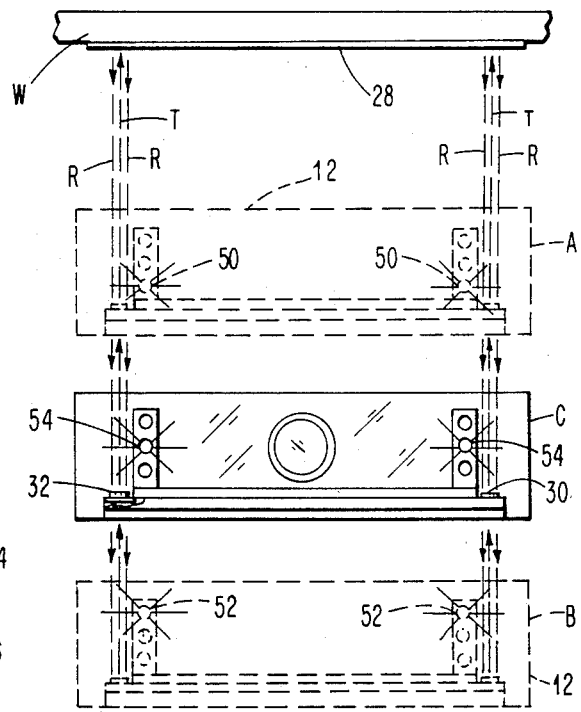
FIG. 2 is a top plan schematic view demonstrating the method of aligning the projection unit with the viewing screen.

As shown in FIG. 2, when the lid 26 is opened to the projecting position (shown in FIG. 1), the image is reflected by the mirror 22 onto a viewing screen 28 mounted to a wall W. In order to assure that the projected image is properly focused on the screen 28 with high resolution and contrast and without distortions, the projecting unit 12 must be properly aligned with the screen.

In order to achieve this, two ultrasonic range finders 30, 32 are mounted to the projection unit 10. The range finder 30 is mounted to the upper right hand corner of the lid 26 while the range finder 32 is mounted to the upper left hand corner of the lid. As is known in the art, each range finder 30, 32 includes a transmitter 34 and a receiver 36 (note FIG. 3). The transmitter 34 connected to a power source 38 generates ultrasonic waves that are directed from the front face of the range finders 30, 32 toward the viewing screen 28 along line T, as is shown FIG. 2. The ultrasonic waves reflect from the screen 28 back toward the range finders 30, 32 along lines R and impinge on the receiver 36. The receiver 36 transduces the ultrasonic waves into electric signals. The signals vary in accordance with the elapsed time between the transmitted signal and the received signal, thus directly indicating the distance the range finders 30, 32 and, therefore, each of the right and left sides of the projection unit 10 are from the screen 28.

Figure 3:
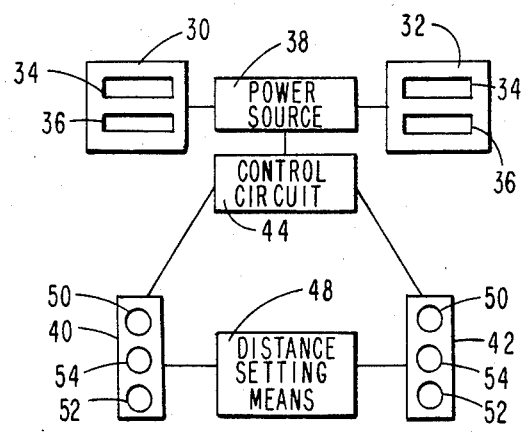
FIG. 3 is a schematic circuit diagram of the aligning apparatus of the present invention.

Two visual readers 40, 42 are connected to the range finders 30, 32 and receive the signals denoting the distances. As shown in FIG. 3, the visual reader 40 is connected via circuitry to the range finder 30 while the visual reader 42 is connected to the range finder 32. Each visual reader 40, 42 includes, for example, three light emitting diodes (LED) that indicate when the projection unit 10 is aligned a proper operating distance from and parallel to the viewing screen 28 so as to project a clear and sharp-focused image.

The distance signal generated by the range finder 30 travels through control circuit 44 to reader 40. The signal generated by the range finder 32 also travels through the control circuit 44 to the reader 42. A means 48 may be provided to set the distance parameter necessary to obtain the best quality image on the screen 28.

The output light display of readers 40, 42 are visually compared. If both sides of the projection unit 10 are too close to the screen 28 as demonstrated in the dash line position A in Figure 2, the light emitting diodes 50 are illuminated. Conversely, if both sides of the unit 12 are positioned too far from the screen 28 (note dash line position B in FIG. 2), both light emitting diodes 52 are illuminated. If, however, the projection unit 12 is positioned with both sides the proper distance from the screen 28, both the light emitting diodes 54 are illuminated (note full line position C).

The method of operation of the alignment apparatus of the present invention is simple. As clearly set out above, the initial step involves sensing the distances between opposite sides (right and left) of the projection unit 12 and the viewing screen 28. This, of course, is done utilizing the ultrasonic range finders 30, 32. The next step involves indicating whether each of the sides of the projection unit 12 is (a) too close to the viewing screen 28, (b) too far away from the viewing screen or (c) a proper operating distance from the viewing screen.

The position of the projecting unit 12 relative to the screen 28 is physically adjusted while observing the light emitting diodes 50, 52, 54 until the unit is positioned a proper distance from and parallel to the screen.

For example, where the projection unit 10 is initially in position A shown in FIG. 2, both sides of the unit are gradually moved away from the screen 28 until the diodes 50 are extinguished and the diodes 54 are illuminated indicating proper positioning. Where the unit 10 is initially in position B shown in FIG. 2, each side of the unit is gradually moved toward the screen 28 until the diodes 52 are extinguished and the diodes 54 are illuminated.

The parallel alignment of the projecting unit 10 with the viewing screen 28 is also assured utilizing this system. If the unit 10 is not parallel with the screen 28, one of the readers 40, 42 will indicate that its side of the unit is too close to the screen while the other reader will indicate its side of the unit is too far away from the screen. The unit is then adjusted by physically pivoting it.

In summary, numerous benefits have been described which result from employing the concepts of the invention. By positioning ultrasonic range finders 30, 32 adjacent opposite sides (right and left) of the projection unit 10, the projection unit may be aligned with the viewing screen 28 both a proper operating distance from the screen and parallel to the screen. This advantageously assures not only a sharp focused picture with high resolution and contrast, but also a picture without distortions. This is particularly important where the projection unit is part of a teleconferencing system where detailed material, such as blueprints or engineering drawings, are to be viewed on the screen.

The foregoing description of a preferred embodiment of the invention has been presented for purposes of illustration and description. It is not intended to be exhaustive or to limit the invention to the precise form disclosed. Obvious modifications or variations are possible in light of the above teachings.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. An apparatus for alignment of a projection unit before a remote viewing screen or the like, comprising:
    a first energy beam means mounted substantially adjacent a side of the projection unit and directed toward the remote viewing screen;
    a second energy beam means mounted substantially adjacent an opposite side of the projection unit and directed toward the remote viewing screen; and
    means responsive to said energy beam means for indicating the aligning of the projection unit a proper operating distance from and parallel to the remote viewing screen so as to produce a clear, sharp image.

2. The alignment apparatus of claim 1, wherein said first and second energy beam means each comprise an ultrasonic rangefinder including a transmitter for the beam and a receiver for the reflected beam from the screen.

3. The alignment apparatus of claim 1, wherein said indicating means includes visual reader means connected through circuitry to said first and second energy beam means.

4. The alignment apparatus of claim 1, wherein are provided means for setting the proper distance parameter for the projection unit.

5. The alignment apparatus of claim 1, wherein the projection unit employs a cathode-ray tube.

6. A method for properly positioning a projection unit employing a cathode-ray tube before a viewing screen or the like, comprising:
    sensing distances between opposite sides of the projection unit and the viewing screen;
    indicating whether each of the opposite sides of the projection unit are (a) too close to the viewing screen, (b) too far away from the viewing screen or (c) a proper operating distance from the viewing screen; and
    adjusting the positioning of the projection unit relative to the viewing screen until the opposite sides of the projection unit are concurrently indicated as being the proper operating distance from the screen.

7. An apparatus for alignment of a projection unit before a viewing screen or the like, comprising:
    a first energy beam means mounted substantially adjacent a side of the projection unit and directed toward the viewing screen;
    a second energy beam means mounted substantially adjacent an opposite side of the projection unit and directed toward the viewing screen; and
    means responsive to said energy beam means for indicating the aligning of the projection unit a proper operating distance from and parallel to the viewing screen so as to produce a clear, sharp image; said indicating means including visual reader means connected through circuitry to said first and second energy beam means; said visual reader means including a pair of reader units, one reader unit connected to each energy beam means; each reader unit including three light emitting diodes, actuation of a first of said three diodes indicating one side of the projection unit is too close to the viewing screen, actuation of a second of said three diodes indicating one side of the projection unit is the proper operating distance from the viewing screen and actuation of a third of said three diodes indicating one side of the projection unit is too far away from the viewing screen.

* * * * *